United States Patent [19]

Kasagi et al.

[11] 4,114,924
[45] Sep. 19, 1978

[54] INFLATABLE BAG APPARATUS FOR PROTECTING OCCUPANTS IN VEHICLES

[75] Inventors: Takao Kasagi, Okazaki; Satoshi Kuwakado, Nishio; Toshihiro Takei, Okazaki, all of Japan

[73] Assignee: Nippon Soken, Inc., Nishio, Japan

[21] Appl. No.: 702,135

[22] Filed: Jul. 2, 1976

[30] Foreign Application Priority Data

Jul. 11, 1975 [JP] Japan .................. 50-85668

[51] Int. Cl.$^2$ ............................................. B60R 21/08
[52] U.S. Cl. ........................................ 280/740; 55/394
[58] Field of Search ............... 280/736, 737, 738, 739, 280/740, 741, 742, 729; 222/5; 137/68 R, 68 A, 69, 70, 71; 55/399, 394, 477

[56] References Cited

U.S. PATENT DOCUMENTS

| | | | |
|---|---|---|---|
| 2,134,978 | 11/1938 | Marshall | 55/594 |
| 2,947,315 | 8/1960 | Connell | 137/68 A |
| 3,567,245 | 3/1971 | Ekstrom | 137/68 A X |
| 3,618,980 | 11/1971 | Leising | 280/736 |
| 3,653,684 | 4/1972 | Plumer | 222/5 X |
| 3,674,059 | 7/1972 | Stephenson | 280/737 X |
| 3,788,665 | 1/1974 | Noll et al. | 280/729 |
| 3,836,170 | 9/1974 | Grosch | 280/737 |
| 3,869,143 | 3/1975 | Merrell | 280/737 |
| 3,900,211 | 8/1975 | Russell | 280/737 |

FOREIGN PATENT DOCUMENTS

| | | | |
|---|---|---|---|
| 967,192 | 5/1975 | Canada | 280/737 |
| 2,144,549 | 3/1972 | Fed. Rep. of Germany | 280/736 |

*Primary Examiner*—Kenneth H. Betts
*Attorney, Agent, or Firm*—Cushman, Darby & Cushman

[57] ABSTRACT

In a safety inflatable bag apparatus for protecting occupants of a vehicle, when collision of a vehicle occurs, a blocking cock of a high pressure gas container is destroyed by explosion of ignitors, as a result of which high pressure gas is released from the container into the inflatable bag to inflate it for restraining the occupant. By-product fragments or pieces produced upon the explosion of the ignitors are collected in a collecting chamber disposed at a bent portion of a duct connecting the high pressure gas container and the inflatable bag, thereby to eliminate the need for a conventional filter or prevent the filter, if used, from being clogged.

6 Claims, 4 Drawing Figures

INFLATABLE BAG APPARATUS FOR PROTECTING OCCUPANTS IN VEHICLES

BACKGROUND OF THE INVENTION

1. Field of the Invention

The present invention relates to an inflatable bag protection apparatus for vehicles such as motor vehicles adapted to be driven at high speeds, and in particular to an apparatus for collecting harmful explosion by-product fragments or pieces produced at the time when the protection apparatus is operated.

2. Description of the Prior Art

In a hitherto known inflatable bag apparatus, a high pressure gas bomb or container which contains usually nitrogen gas at a pressure of 200 to 300 kg/cm$^2$ is employed. The high pressure gas bomb has an opening which is closed by a blocking cock which is fluid-tightly secured to the container integrally therewith by welding. The blocking cock is provided with a sealing plate at the side contacting with the high pressure gas in the bomb, and one or plural (usually two or three) electric ignitors or exploders disposed at a rear side of the sealing plate in juxtaposition to one another in opposition to the sealing plate and held in place by means of retainers of an elastic material such as rubber.

The cock is formed with a cavity to which a nozzle having a plurality of orifices is connected, the cavity being communicated with a duct which in turn is connected to a cylindrical diffuser having a plurality of slits. There is fitted in the diffuser a filter constituted by a metal mesh having 10 to 30 mesh size and wound around a porous cylinder by two or three turns. An inflatable bag made of a synthetic fabric such as nylon fabric is provided to the diffuser in a folded or collapsed state.

When the collision of the vehicle is detected by a collision sensor, the electric ignitors are instantaneously exploded to destroy the sealing plate, and a high pressure gas is directed into the diffuser through a nozzle and the duct. The harmful explosion residues such as copper pieces of the cylindrical casings of the ignitors and small iron fragments of the destroyed sealing plate as produced upon the explosion of the ignitors are trapped by a filter provided in the diffuser, whereby only the high pressure gas is permitted to be blown into the inflatable bag through the slits of the diffuser which causes uniform gas injections to expand the inflatable bag.

The hitherto known apparatus of the structure as described above is disadvantageous in that the meshes of filter are clogged by relatively fine explosion residues, thereby to deteriorate the gas release performance from the high pressure gas bomb, involving possibly a time lag in the inflation of the inflatable bag, which may seriously effect the occupant protecting function of the apparatus.

In addition, the clogging of the filter may result in an abnormal increase in the gas pressure prevailing in the diffuser and duct at the up-stream side of the filter to eventually deform or destroy the diffuser or the duct.

Further, the filter has a complicated structure and not only requires high manufacturing costs but also makes the diffuser bulky and heavy.

SUMMARY OF THE INVENTION

Accordingly, an object of the invention is to provide an inflatable bag apparatus for protecting the occupants in a vehicle upon collision thereof, which apparatus is free from the drawbacks and disadvantages of the conventional apparatus described above.

With the above object in view, there is provided according to a feature of the invention an inflatable bag apparatus in which a pressure gas passage has a bent portion for changing abruptly the flow direction of the high pressure gas released from the container, and an explosion by-product residue collector chamber is provided at the bent portion in such a manner that the residues carried by the pressure gas may enter the collector chamber under inertia force imparted from the flowing gas.

According to another feature of the invention, the explosion residues are introduced into the collector chamber through a nozzle tube projecting into the chamber, whereby the once trapped residues are prevented from flowing out of the collecting chamber.

According to still another feature of the invention, a residue trapping member for catching effectively the explosion residues is disposed in the collector chamber.

BRIEF DESCRIPTION OF DRAWING

The above and other objects, novel features and advantages of the invention will become more apparent from the description of preferred embodiments taken in conjunction with the accompanying drawings in which.

DETAILED DESCRIPTION OF PREFERRED EMBODIMENTS

Now, the invention will be described in detail in conjunction with preferred embodiments shown in the annexed drawings.

Figure 1:
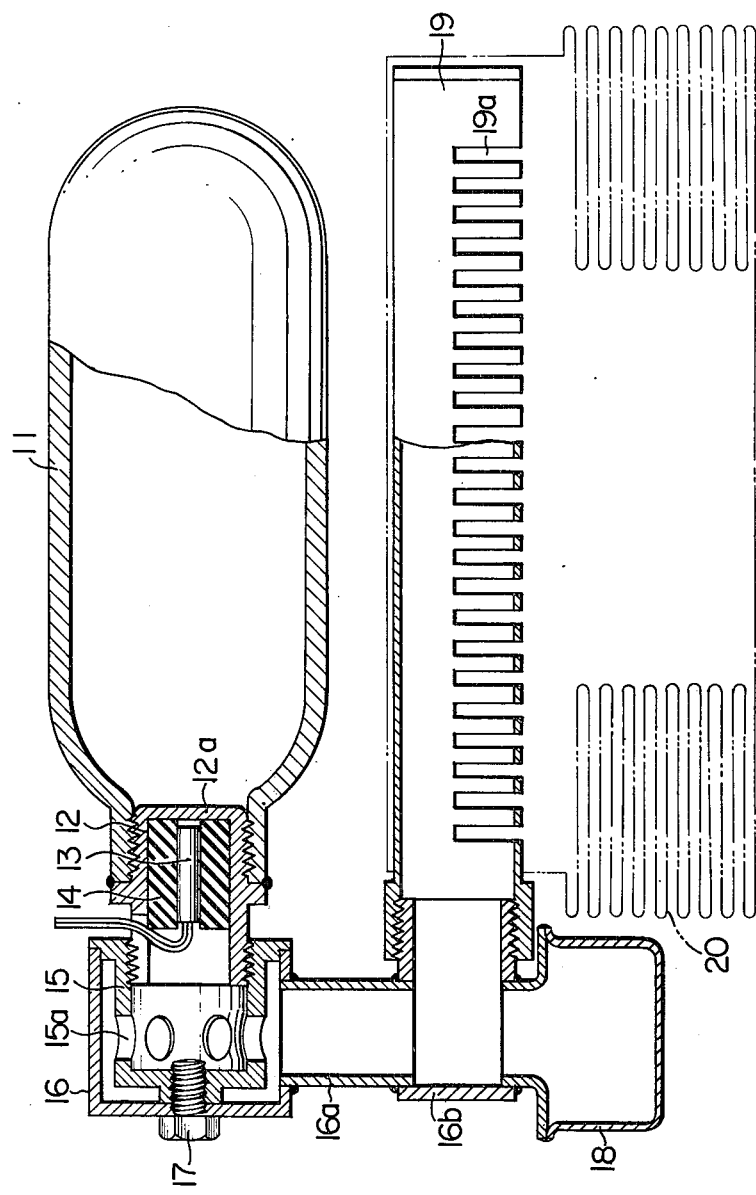
FIG. 1 is a side elevational view showing an embodiment of the inflatable bag protection apparatus according to the invention with some portions being broken away and shown in section.

Referring to FIG. 1 showing a first exemplary embodiment of the inflatable bag protection apparatus according to the invention, reference numeral 11 indicates a bomb or container in which nitrogen gas is contained usually at a pressure in the range of 200 to 300 kg/cm$^2$. The high pressure gas container 11 is provided with an opening at an end extension in which a blocking cock 12 is fluid-tightly disposed and secured to the gas container 11 integrally therewith by welding or the like means. The cock 12 is integrally formed with a rupture disk or sealing plate 12a of the side to contact with the pressurized gas. There are disposed one or three electrical ignitors or exploders 13 in the blocking cock 12 and held in place by means a retainer 14 made of synthetic rubber or the like in position perpendicular to the sealing plate 12a at the side opposite to the gas container 11.

The blocking cock 12 has a hollow end portion which is connected to a nozzle 15 having a plurality of orifices 15a. The nozzle 15 in turn is secured to a duct 16 with a screw 17, which duct 16 constitutes a flow path for directing the pressurized gas into a diffuser 19. To this end, the duct 16 is composed of a first and a second conduits 16a and 16b which are connected perpendicularly to each other by welding, whereby the flowing direction of the pressurized gas in the duct 16 is abruptly changed at the connecting portion.

It should be noted that a residue collecting or trapping chamber 18 is secured directly to the second conduit 16b in an opposed alignment with an open end of the first conduit 16a i.e. at the bent portion. The volume of the residue collecting chamber 18 may be selected about 50 to 300 cc, although it depends on the inner diameter of the conduit 16a or the volume of the bomb 11. The diameter of the aperture at which the trap or collector chamber 18 is connected to the second conduit 16b may be selected same as that of the first conduit 16a.

The second conduit 16b of the duct 16 has an open end portion to which a diffuser 19 having a plurality of slits 19a is connected fluid-tightly. A folded or collapsed bag 20 made of a synthetic resin fabric such as of nylon fabric coated with a suitable resin and having a volume in the range of 100 to 300 l is provided in a manner to wrap the diffuser 19.

According to the invention, it is unnecessary to provide a special filter in the diffuser 19, whereby the flow resistance can be relatively reduced. The apparatus of the above described construction can be mounted in suitable locations of the vehicle in opposition to the seats of the occupants.

The safety inflatable bag apparatus according to the present invention operates in the following manner.

When collision of a motor vehicle is detected by a conventional collision sensor (not shown), the electric ignitors 13 will instantaneously be exploded and the sealing plate 12a as well as the retainer 14 will be thereby ruptured or destroyed to pieces. The gas contained in the bomb or container 11 is ejected rapidly into the nozzle 15 carrying the broken pieces of the sealing plate 12a, explosion products of the ignitors 13 and the copper fragments of the cylinder bodies of the ignitors 13. While the fragments of the sealing plate 12a having a relatively large size are trapped in the nozzle 15, the pressurized gas flows into the conduit 16a of the duct 16 through the orifices 15a and hence into the conduit 16b. Additionally, the flow of the high pressure gas is directed into the explosion by-product pieces or residue collecting chamber 18, into which the harmful residual pieces such as the broken fragments of the electrical ignitors 13 are carried under inertia force imparted from the high pressure gas flow and trapped therein, while the gas is allowed to flow into the diffuser 19.

In this manner, the high pressure gas can be blown into the bag 20 as uniform flows through the slits 19a of the diffuser 19 without being disturbed by the residual pieces, whereby the bag 20 can be rapidly expanded or inflated.

Figure 2:
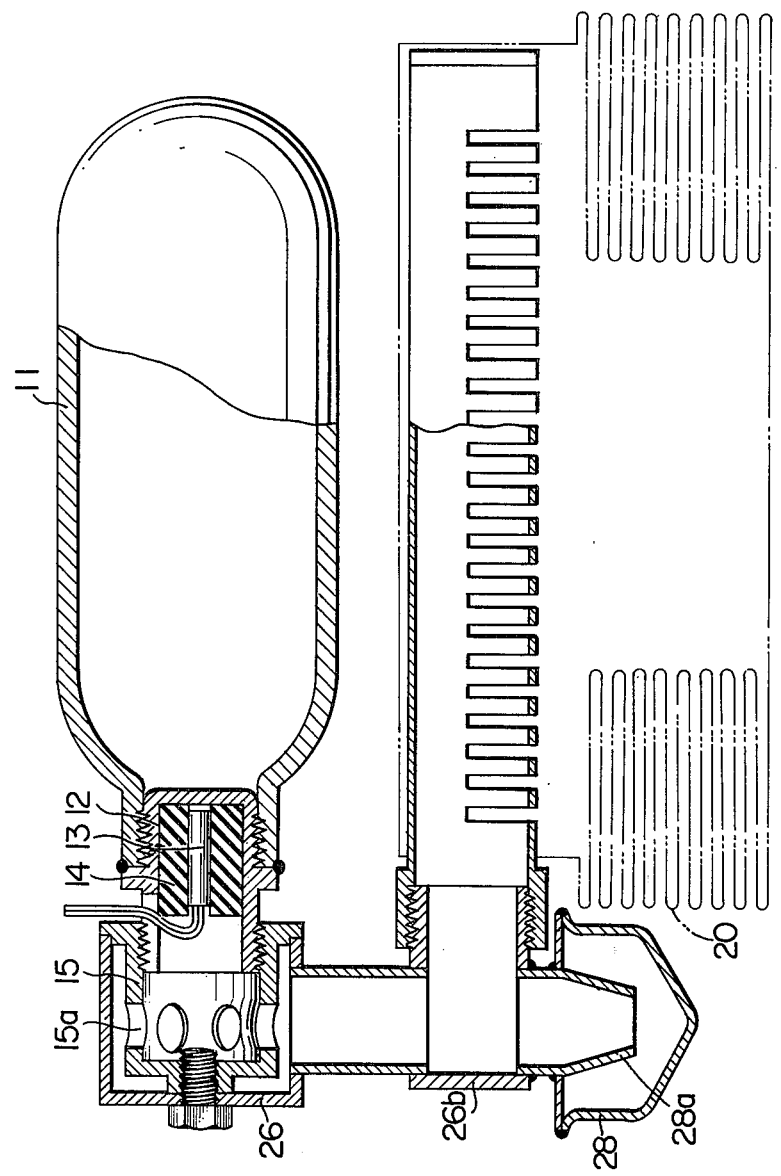
FIG. 2 is a view similar to FIG. 1 and shows a second embodiment of the apparatus according to the invention.

FIG. 2 shows a second embodiment of the inflatable bag apparatus according to the invention. In the case of this embodiment, the explosion residue collecting chamber 28 is secured to the second conduit 26b through a nozzle tube 28a which has a tapered open end portion projecting into the residue collecting chamber 28. It will further be noted that the wall of the chamber 28 confronting the tapered open end of the nozzle tube 28a is formed in a conical configuration.

By virtue of the provision of the nozzle tube 28a of the above structure, the residues once entered the collecting chamber 28 is positively prevented from flowing out of the chamber 28 due to the turbulent flows. In other words, it is assured that the residues of the broken pieces carried by the injected high pressure gas can be trapped in the collector chamber 28 without escaping therefrom.

Figure 3:
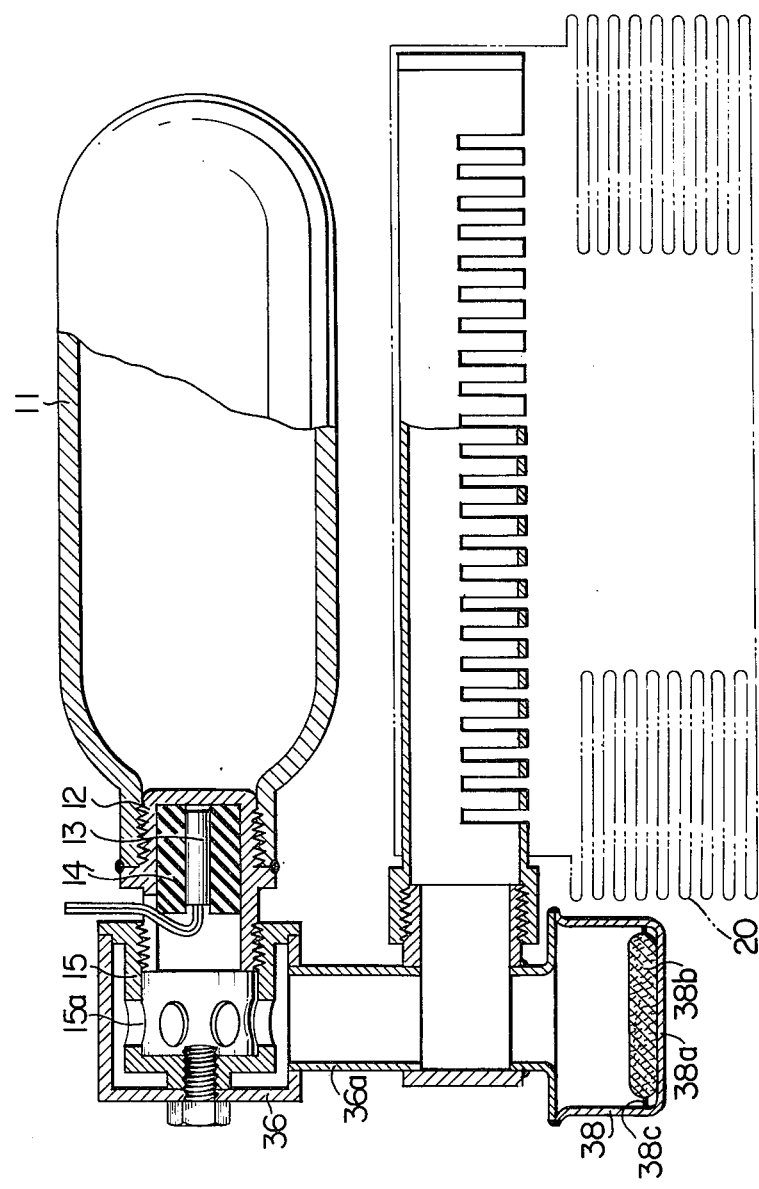
FIG. 3 is a view similar to FIG. 1 and shows a third embodiment of the invention.

Referring to FIG. 3 which shows a third embodiment of the invention, a residue trapping member 38b made of cotton, wool or felt is provided on the bottom portion 38a of the residue collecting chamber 38 in a position to oppose to the flowing direction of the high pressure gas so that the gas entered the chamber 38 will impinge on the trapping member 38b. A circular lip 38c serves to secure the member 38b in place.

In the case of this embodiment, the high pressure gas flowing straight forwardly into the collecting chamber 38 through the straight conduit 36a of the duct 36 will impinge onto the trapping member 38b, whereby the residues of the broken pieces carried by the gas flow will be positively trapped by the trapping member 38b.

Although the residue trapping member 38b is shown as secured by the circular lip 38c, it will be appreciated that any other suitable securing means such as bonding agents may be employed in place of the circular lip.

Figure 4:
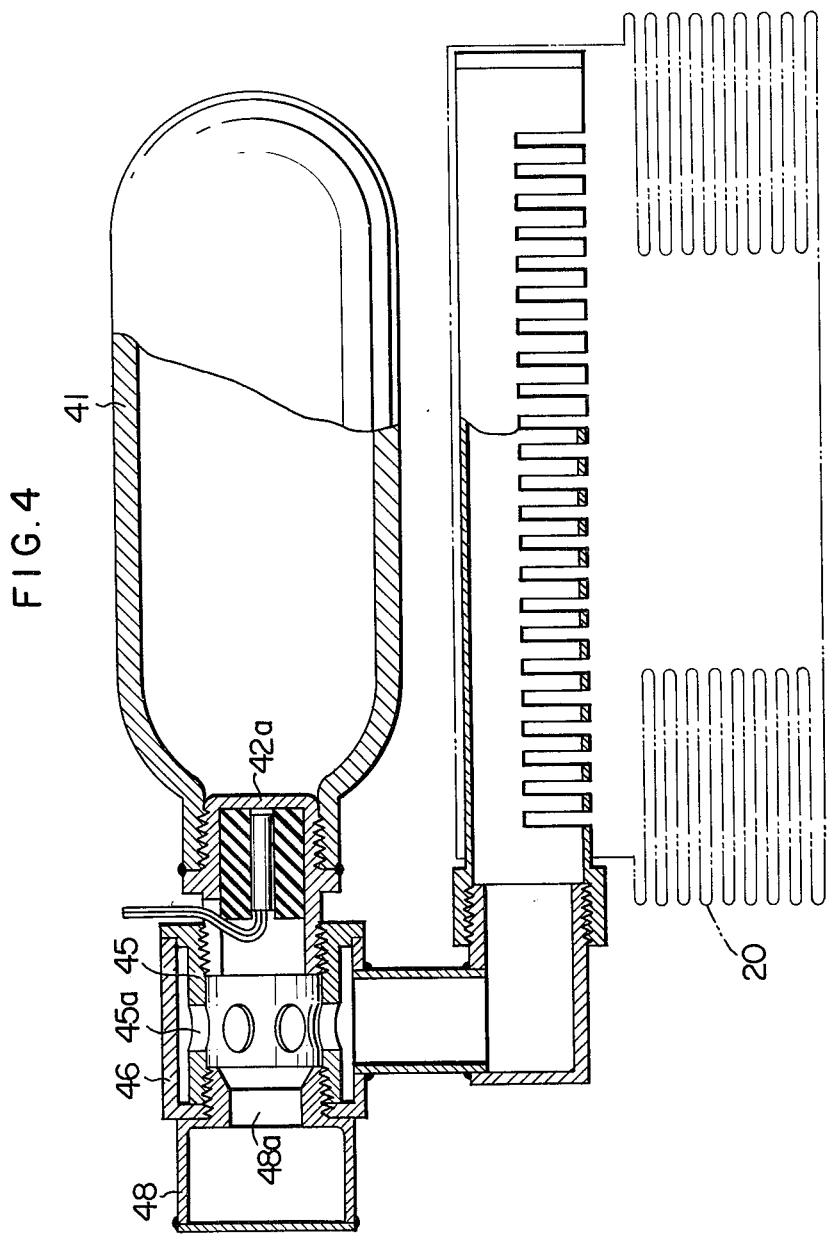
FIG. 4 is a view similar to FIG. 1 showing a fourth embodiment of the invention.

FIG. 4 shows a fourth embodiment of the invention in which the explosion residue collecting chamber 48 is secured to the nozzle 45 having apertures 45a at the side opposite to the open end of the high pressure gas container 41 to collect the explosion residues carried by the high pressure gas flow. The first conduit 46 is so provided as to surround the nozzle 45.

In this embodiment, there arises a possibility that the aperture 48a of the collecting chamber 48 might be closed by a large broken piece of the destroyed sealing plate 42a, therefore it is preferred that the diameter of the aperture 48a be selected greater than that of the ruptured portion of the sealing plate 42a.

As a modification of the fourth embodiment of the invention, the explosion residue collecting chamber 48 may be provided with a nozzle structure such as described above in conjunction with the second embodiment shown in FIG. 2 or alternatively or in combination with the nozzle structure a trapping member such as the one shown in FIG. 3 may be used.

The location at which the explosion residue collecting chamber is disposed is not restricted to those shown in the drawings but may be selected at any portion of the passage of the high pressure gas flow at which the direction of the gas flow is abruptly changed. Further, the source of high pressure gas is not restricted to the high pressure gas bomb or container such as shown in the drawings. Any suitable high pressure gas sources such as of a hybrid type may be equally employed, so far as they can produce a high pressure gas at the time of the emergency. Besides, a diffuser provided with a filter may be effectively used, if desired, without involving the clogging of the filter mesh, whereby an improved bag inflation characteristic can be attained.

As will be appreciated from the foregoing description, there is provided according to the present invention a protection inflatable bag apparatus in which the inflatable bag is inflated by a high pressure gas blown thereinto through a diffuser from a gas container and which has an explosion residue collector chamber for collecting explosion residues produced upon the actuation of the apparatus, the collecting chamber being disposed along the high pressure gas flow passage at the location where the direction of the gas flow is changed. With such arrangement of the explosion residue collecting chamber, it is possible to collect the explosion residues in an improved manner, whereby any deterioration in the inflation characteristic of the protection inflatable bag cab be advantageously prevented.

Further, according to the invention, it is unnecessary to provide a filter for the diffuser, which allows the use of a small size diffuser to effect a satisfactory inflation of the air-bag.

According to another feature of the invention such that the nozzle tube is disposed as projecting into the explosion residue trapping chamber, the collection of the residues can be effectively accomplished with the once trapped residues being positively prevented from flowing out from the collection chamber.

According to further feature of the invention such that the residue trapping member is disposed in the explosion residue collecting chamber, the positive and effective trapping of the residues can be accomplished.

We claim:

1. An inflatable bag apparatus for protecting occupants in a vehicle comprising:
    a container for pressurized gas having an opening therein, a gas sealing member for closing said opening in a gas fluid-tight sealing manner,
    an ignitor disposed adjacent to said gas sealing member for exploding and breaking said gas sealing member into pieces upon a vehicle collision,
    a nozzle member having a plurality of apertures for passing the pressurized gas discharged from said container, said nozzle member being connected to said opening adjacent to said ignitor so as to trap relatively large-size fragments produced when said ignitor explodes said gas sealing member,
    a first conduit having one end thereof connected to said nozzle member for receiving pressurized gas discharged from said container,
    a trapping chamber connected to the other end of said first conduit, having a cross-section larger than that of said first conduit thereby positively trapping therein small sized fragments produced when said ignitor explodes said gas sealing member,
    a second conduit having one end connected to said first conduit intermediate the said ends of said first conduit so that the pressurized gas passing through said first conduit is deflected from said first conduit to said second conduit thereby separating from the pressurized gas small sized fragments produced when said ignitor explodes said gas sealing member, and
    an inflatable bag connected to the other end of said second conduit to receive the pressurized gas discharged from said second conduit.

2. An inflatable bag apparatus as set forth in claim 1 wherein said inflatable bag apparatus further comprises a diffuser connected to said other end of said second conduit, through which diffuser the pressurized gas discharged from said container flows into said inflatable bag, said diffuser being located in juxtaposed relationship with said container.

3. An inflatable bag apparatus as set forth in claim 1 wherein said first conduit and said second conduit are so connected together that their axes intersect substantially at right angles.

4. An apparatus as set forth in claim 1, further comprising a tube projecting into said trapping chamber, said first conduit being communicated with said trapping chamber through said tube.

5. An apparatus as set forth in claim 4, wherein said nozzle tube is tapered toward the end thereof projecting into said trapping chamber.

6. An apparatus as set forth in claim 1, wherein said trapping chamber is provided with a trapping member so as to trap the small size fragments entering into said chamber through said first conduit.

* * * * *